US012720361B2

(12) United States Patent
Torres Ortega et al.

(10) Patent No.: US 12,720,361 B2
(45) Date of Patent: Aug. 25, 2026

(54) SYSTEM AND METHOD FOR OPTIMIZING QUALITY OF SERVICE OF VEHICLE COMMUNICATIONS IN A NETWORK USING MATCHMAKING AND LOBBY FUNCTIONALITY

(71) Applicant: Continental Automotive Systems, Inc., Auburn Hills, MI (US)

(72) Inventors: Abdon Torres Ortega, Guadalajara (MX); Alma Angelica Vargas Mandujano, Tlaquepaque (MX); Jorge Luis Urbina Martinez, Zapopan (MX); Luis Francisco Ortiz Rosas, Guadalajara (MX); Pau Masallach Armijo, Tlajomulco de Zuniga (MX)

(73) Assignee: AUMOVIO Systems, Inc., Auburn Hills, MI (US)

( * ) Notice: Subject to any disclaimer, the term of this patent is extended or adjusted under 35 U.S.C. 154(b) by 298 days.

(21) Appl. No.: 18/640,020

(22) Filed: Apr. 19, 2024

(65) Prior Publication Data

US 2025/0330863 A1 Oct. 23, 2025

(51) Int. Cl.

| | |
|---|---|
| ***H04L 12/26*** | (2006.01) |
| ***H04W 4/44*** | (2018.01) |
| ***H04W 24/02*** | (2009.01) |
| ***H04W 28/02*** | (2009.01) |

(52) U.S. Cl.

CPC ......... *H04W 28/0268* (2013.01); *H04W 4/44* (2018.02); *H04W 24/02* (2013.01)

(58) Field of Classification Search

CPC ... H04W 28/0268; H04W 4/44; H04W 24/02; H04W 4/40; H04L 67/12; H04L 67/61

See application file for complete search history.

(56) References Cited

U.S. PATENT DOCUMENTS

| | | | | |
|---|---|---|---|---|
| 10,139,239 | B2 | 11/2018 | Israelsson | |
| 10,733,885 | B2 | 8/2020 | Cho | |
| 10,878,693 | B2 | 12/2020 | Ma | |
| 11,653,252 | B2 | 5/2023 | Rao et al. | |
| 2017/0243485 | A1* | 8/2017 | Rubin | H04W 4/46 |
| 2019/0068434 | A1* | 2/2019 | Moreira da Mota | G08G 1/052 |

(Continued)

FOREIGN PATENT DOCUMENTS

| | | | | |
|---|---|---|---|---|
| CN | 121358648 A * | 1/2026 | | G01C 21/3874 |
| WO | WO-2018211488 A1 * | 11/2018 | | H04N 21/43615 |

(Continued)

OTHER PUBLICATIONS

Mir Zeeshan Hameed et al "Enabling DSRC and C-V2X Integrated Hybrid Vehicular Networks: Architecture and Protocol", IEEE Access, Oct. 5, 2020, pp. 180909-180927, IEEE, USA.

(Continued)

*Primary Examiner* — Thai Dinh Hoang

(57) ABSTRACT

A system and method for optimizing quality of service (QoS) of vehicle communications by collecting data associated with vehicles, matching the vehicles based upon commonality of the collected data, and grouping the matched vehicles into a virtual lobby. The QoS data associated with the communication interface of each vehicle in the lobby is analyzed, and those vehicles in the lobby having poor QoS are switched to the communication interface used by other vehicle(s) in the lobby having better QoS.

18 Claims, 5 Drawing Sheets

(56) References Cited

U.S. PATENT DOCUMENTS

| | | | | |
|---|---|---|---|---|
| 2019/0368882 | A1 | 12/2019 | Wheeler | |
| 2021/0061306 | A1* | 3/2021 | Dagan | H04W 4/40 |
| 2021/0114616 | A1 | 4/2021 | Altman | |
| 2022/0030430 | A1 | 1/2022 | Lund | |
| 2022/0332350 | A1* | 10/2022 | Jha | H04W 4/023 |
| 2022/0345859 | A1* | 10/2022 | Falla Cepeda | G01C 21/3841 |
| 2023/0007453 | A1 | 1/2023 | Higuchi et al. | |

FOREIGN PATENT DOCUMENTS

| | | | | |
|---|---|---|---|---|
| WO | 2018225067 | A1 | 12/2018 | |
| WO | WO-2020205597 | A1 * | 10/2020 | G06N 20/00 |
| WO | WO-2021067140 | A1 * | 4/2021 | H04W 28/0284 |
| WO | WO-2021141770 | A1 * | 7/2021 | G06F 18/23211 |
| WO | WO-2021194590 | A1 * | 9/2021 | G06V 20/58 |

OTHER PUBLICATIONS

International Search Report and Written Opinion mailed on Jun. 10, 2025 from corresponding International patent application No. PCT/US2025/025092.

* cited by examiner

A: Local cellular network connection (V2N)
B: Alternative network connection (V2N)
C: Infrastructure connection (V2I)
D: Network backhaul
E: Vehicle to Vehicle connection (V2V)

SYSTEM AND METHOD FOR OPTIMIZING QUALITY OF SERVICE OF VEHICLE COMMUNICATIONS IN A NETWORK USING MATCHMAKING AND LOBBY FUNCTIONALITY

TECHNICAL FIELD

The present disclosure generally relates to a system and method of vehicle communication, and more particularly to a system and method for optimizing quality of service communications of vehicles in a network using matchmaking and lobby functionality.

BACKGROUND

A vehicular network, often referred to as V2X (Vehicle-to-Everything), is a comprehensive communication ecosystem that facilitates connectivity and data exchange between vehicles, infrastructure, pedestrians, and/or network(s). As such, V2X encompasses various communication technologies, including V2I (Vehicle-to-Infrastructure), V2V (Vehicle-to-Vehicle), V2P (Vehicle-to-Pedestrian), and V2N (Vehicle-to-Network). Vehicle-to-Infrastructure (V2I) enables vehicles to communicate with infrastructure elements such as traffic signals and roadside units to receive real-time traffic information and enhance navigation. Vehicle-to-Vehicle (V2V) allows vehicles to exchange data directly with nearby vehicles, enabling cooperative relationships, such as collision avoidance. Vehicle-to-Pedestrian (V2P) facilitates communication between vehicles and pedestrians or cyclists, enhancing pedestrian awareness. Vehicle-to-Network (V2N) connects vehicles to the network or cloud-based services, providing access to a wide range of information and services for improved driving experiences. Together, these components form a cohesive ecosystem that can enhance road safety, traffic efficiency, and mobility in connected and autonomous vehicle environments.

SUMMARY

At least one challenge in vehicular networks is ensuring a high quality of service (QoS), such as low latency communication. Due to the dynamic nature of vehicular environments and real-time data exchange, delays in communication can lead to consequences such as accidents, traffic congestion, poor coordination of emergency vehicles, or the like. Additionally, factors such as network congestion, intermittent connectivity, and signal interference further exacerbate QoS issues, making it challenging to maintain reliable and responsive communication within vehicular networks. Accordingly, there is an ongoing need to address such QoS issues to ensure a more seamless connectivity in dynamic vehicular environments.

At least one aspect of the present disclosure solves one or more problems of poor QoS in vehicular networks by providing a unique vehicle communication architecture that utilizes matchmaking between vehicles based upon common characteristic(s) (e.g., commonality in geographical position and/or geographical destination), and then groups the vehicles into a virtual lobby based upon this matchmaking, whereby QoS for each vehicle is analyzed, and those vehicles in the lobby having poor QoS are switched to the communication interface used by other vehicle(s) in the lobby having better QoS.

According to an aspect, a system for optimizing quality of service (QoS) of vehicle communications, including: one or more servers configured to establish communication with vehicles; communication interfaces operably coupled to the one or more servers, the communication interfaces being configured to communicate data between the one or more servers and the vehicles; memory having executable instructions stored thereon; one or more processors operably coupled to the memory, the one or more processors being configured to execute the instructions to perform a process including the steps: (i) collecting data associated with the vehicles; (ii) matching the vehicles based upon commonality of at least some of the collected data being within one or more defined matching thresholds; (iii) grouping the matched vehicles into a virtual lobby stored on the one or more servers; (iv) analyzing quality of service (QoS) data associated with the communication interface for each vehicle in the lobby; (v) based at least upon the analyzed QoS data, identifying one or more of the vehicles in the lobby having QoS that is below a defined QoS threshold and/or identifying one or more of the vehicles in the lobby having optimal QoS; and (vi) (a) switching the communication interface of any vehicle in the lobby having QoS below the defined QoS threshold to the communication interface used by another vehicle in the lobby having QoS at or above the defined QoS threshold; or (b) switching the communication interface of any vehicle in the lobby having QoS below the defined QoS threshold to the communication interface used by the one or more vehicles in the lobby having the optimal QoS; or (c) switching the communication interface of any vehicle in the lobby having QoS below the optimal QoS to the communication interface used by the one or more vehicles in the lobby having the optimal QoS.

According to another aspect, a method controlled by one or more processors for optimizing quality of service (QoS) of vehicle communications, the method including: (i) collecting data associated with vehicles; (ii) matching the vehicles based upon commonality of at least some of the collected data being within one or more defined matching thresholds; (iii) grouping the matched vehicles into a virtual lobby stored on the one or more servers; (iv) analyzing quality of service (QoS) data associated with the communication interface for each vehicle in the lobby; (v) based at least upon the analyzed QoS data, identifying one or more of the vehicles in the lobby having QoS that is below a defined QoS threshold and/or identifying one or more of the vehicles in the lobby having optimal QoS; and (vi) (a) switching the communication interface of any vehicle in the lobby having QoS below the defined QoS threshold to the communication interface used by another vehicle in the lobby having QoS at or above the defined QoS threshold; or (b) switching the communication interface of any vehicle in the lobby having QoS below the defined QoS threshold to the communication interface used by the one or more vehicles in the lobby having the optimal QoS; or (c) switching the communication interface of any vehicle in the lobby having QoS below the optimal QoS to the communication interface used by the one or more vehicles in the lobby having the optimal QoS.

According to another aspect, a non-transitory computer readable medium storing program code which when executed by one or more processors performs at least the steps: (i) collecting data associated with vehicles; (ii) matching the vehicles based upon commonality of at least some of the collected data being within one or more defined matching thresholds; (iii) grouping the matched vehicles into a virtual lobby stored on the one or more servers; (iv) analyzing quality of service (QoS) data associated with the communication interface for each vehicle in the lobby; (v)

based at least upon the analyzed QoS data, identifying one or more of the vehicles in the lobby having QoS that is below a defined QoS threshold and/or identifying one or more of the vehicles in the lobby having optimal QoS; and (vi) (a) switching the communication interface of any vehicle in the lobby having QoS below the defined QoS threshold to the communication interface used by another vehicle in the lobby having QoS at or above the defined QoS threshold; or (b) switching the communication interface of any vehicle in the lobby having QoS below the defined QoS threshold to the communication interface used by the one or more vehicles in the lobby having the optimal QoS; or (c) switching the communication interface of any vehicle in the lobby having QoS below the optimal QoS to the communication interface used by the one or more vehicles in the lobby having the optimal QoS.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

DETAILED DESCRIPTION

The principles and aspects according to the present disclosure have particular application to vehicular networks, and thus will be described herein mainly in this context. It is understood, however, that the principles and aspects of the present disclosure may be applicable to other types of systems or methods for other applications when desirable to provide one or more advantages of the system(s) and/or method(s) described herein.

Figure 1:
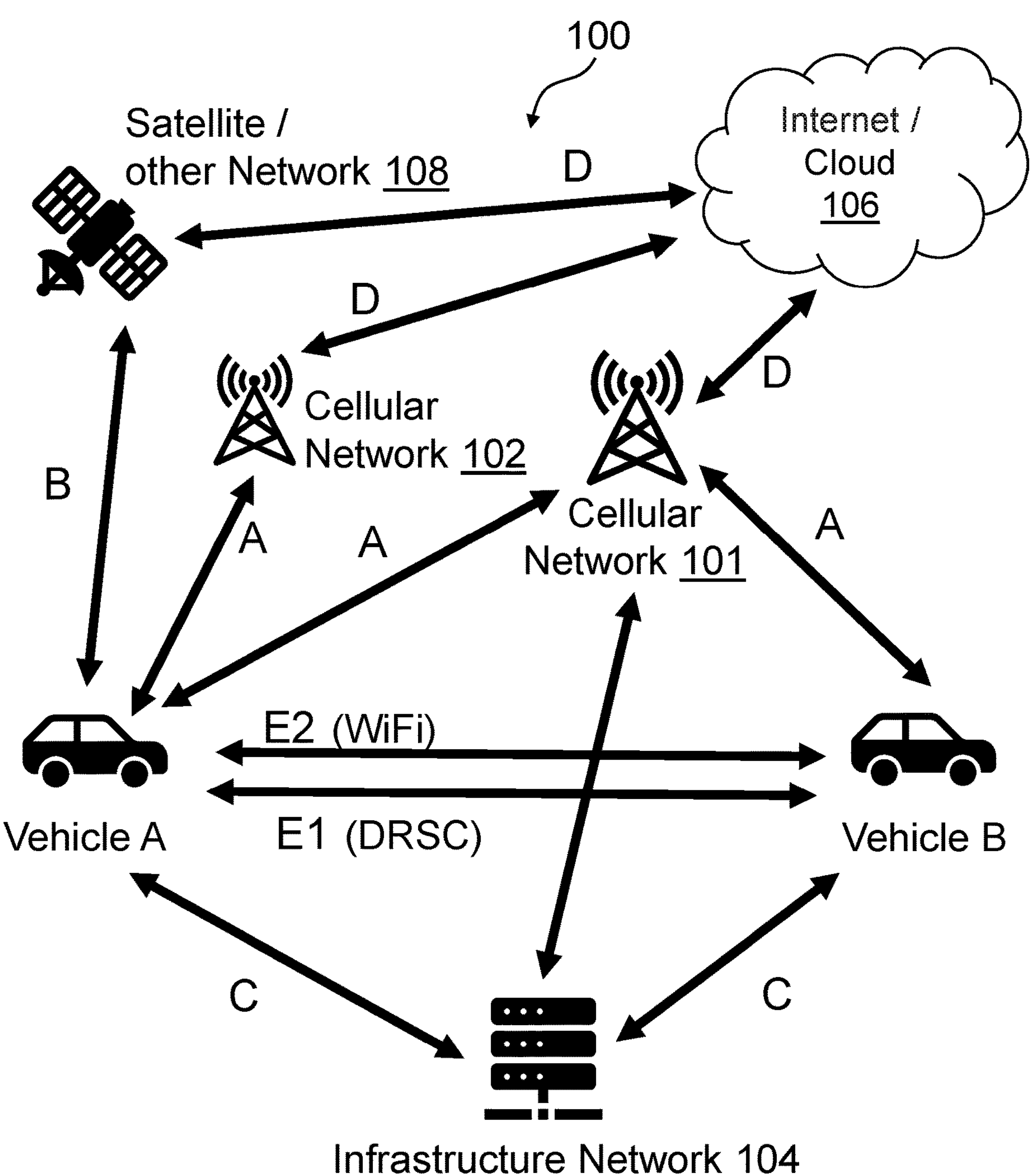
FIG. 1 is a schematic diagram illustrating a vehicular network that uses the exemplary system and method according to an embodiment of the present disclosure.

Referring initially to FIG. 1, a schematic diagram of a vehicular network 100 is shown. The vehicular network 100 (also referred to as V2X or vehicle-to-everything) encompasses a communication ecosystem that enables connectivity and data exchange between vehicles, infrastructure, pedestrians, network(s), internet/cloud, or the like. This data exchange occurs via communication interfaces, which can include any suitable communication technology. For example, in the illustrated V2X network 100, the communication interfaces for Vehicles A and B are shown to include different communication modes between entities (e.g., V2N (modes A and B), V2I (mode C), or V2V (mode E)), different communication channels between entities (e.g., channels E1 and E2), and/or different communication nodes between entities (e.g., Cell network node 101 and Cell network node 102).

As used herein, a communication mode refers to a specific method or type of communication within a network. It defines the nature and purpose of the communication between different entities or components. Examples of communication modes include V2I (Vehicle-to-Infrastructure), V2V (Vehicle-to-Vehicle), V2N (Vehicle-to-Network), or the like. Each communication mode serves a distinct role in facilitating data exchange and interaction within the network ecosystem.

A communication channel refers to the pathway or medium through which data is transmitted between communicating entities within a network. It encompasses the physical or logical connection that facilitates the exchange of information. Examples of communication channels include Wi-Fi, cellular, DSRC (Dedicated Short-Range Communication), Ethernet, fiber optic cables, and others. Each communication channel has its characteristics, such as bandwidth, latency, and range, which influence the efficiency and performance of data transmission.

A communication node is a network device or point of connection within a communication network. It serves as an endpoint for data transmission and may perform functions such as routing, switching, or relaying data between different parts of the network. Examples of communication nodes include cellular towers, routers, switches, access points, and servers. Communication nodes facilitate communication between different entities or components within the network to provide seamless connectivity and data exchange.

As described in further detail below, the exemplary system described herein provides a unique vehicle communication architecture that utilizes matchmaking between vehicles (A, B) to group them into a virtual lobby based on common characteristic(s), and then switches the communication interface of those vehicle(s) in the lobby having poor quality of service (QoS) to the communication interface(s) used by the vehicle(s) in the lobby having better or optimal QoS.

Generally, quality of service (QoS) is a set of techniques used to manage and prioritize network traffic to ensure that certain types of traffic can receive preferential treatment over others. QoS mechanisms are typically defined and measured using several parameters, including packet loss, latency, and jitter, among others such as throughput, bandwidth, reliability, etc. Analysis of QoS, therefore, includes assessing and evaluating the quality of service provided by a network or communication system, which may involve monitoring and measuring these various performance parameters to determine how well the network is performing and identifying areas of improvement to ensure better quality of service for users.

As a QoS parameter, packet loss generally refers to the percentage of data packets that are lost or discarded during transmission. This can occur due to network congestion, hardware failures, or other issues. Packet loss can degrade the quality of real-time communication applications. QoS mechanisms aim to minimize packet loss by prioritizing certain types of traffic and ensuring sufficient network resources are allocated to them.

Latency, also known as delay, is the time it takes for a data packet to travel from its source to its destination across a network. High latency can result in sluggish network performance and negatively impact real-time communications. QoS techniques such as traffic prioritization and traffic shaping can help reduce latency by ensuring that time-sensitive traffic is given higher priority over less time-sensitive traffic.

Jitter refers to the variation in latency experienced by packets as they traverse a network. In other words, jitter relates to the difference in delay between packets in a data stream. Jitter can cause problems for real-time applications by causing packets to arrive out of order or at irregular intervals, leading to poor communication quality. QoS mechanisms like jitter buffering and traffic prioritization can help mitigate jitter by smoothing out variations in latency and ensuring consistent delivery of packets.

Throughput refers to the rate at which data is successfully transmitted through a communication system or network over a certain period of time. It represents the actual amount of data transferred and received by the destination within a specific timeframe. Throughput is typically measured in bits per second (bps), kilobits per second (kbps), megabits per second (Mbps), or other similar units of data transfer rate.

Bandwidth commonly refers to the maximum amount of data that can be transmitted through a communication channel or network connection in a given period of time. It represents the capacity or capability of the channel to carry data. Bandwidth is often expressed in bits per second (bps), kilobits per second (kbps), megabits per second (Mbps), or gigabits per second (Gbps). It can also refer more broadly to the range of frequencies available for data transmission in a communication system.

Reliability in the context of networking or communication systems refers to the ability of the system to consistently deliver data packets or messages accurately and without errors, as well as to maintain stable and consistent performance over time. A reliable network or system ensures that data is transmitted and received correctly, without loss or corruption, and that the system operates consistently without unexpected downtime or failures. Reliability is often measured using metrics such as uptime, mean time between failures (MTBF), and mean time to repair (MTTR), among others.

As shown in FIG. 1, the Vehicle-to-Infrastructure (V2I) communication mode A enables vehicles to communicate with an infrastructure network 104 to receive real-time traffic information and enhance navigation. The infrastructure network 104 includes infrastructure hardware, such as traffic signals or roadside units (RSUs) which serve as communication nodes within the vehicular network. For example, roadside units are components of the infrastructure in the vehicular network that are typically installed along roadsides or at certain locations within the transportation network. These units are equipped with communication hardware to facilitate interactions with vehicles and other components of the transportation system. The typical communication channel between vehicles (A, B) and the infrastructure network 104 is through a combination of wired and wireless technologies. For example, RSUs are often connected to a server or network infrastructure via wired communication technologies such as Ethernet or fiber optic cables. RSUs also typically utilize wireless communication technologies such as dedicated short-range communication (DSRC) or Wi-Fi to exchange data with the vehicles on the road. Because of such connections, the V2I mode of communication can often add 20-50 msec of latency to data transfer.

Vehicle-to-Vehicle (V2V) communication mode E allows vehicles to exchange data directly with nearby vehicles. For example, vehicles A and B can share information such as speed, position, and acceleration to enable collision avoidance and cooperative driving. Technologies such as mesh networking (allowing mobile devices to dynamically act as routers for data from other mobile devices) and multi-hop (essentially a subset of mesh networking) can allow vehicles to support each other's data paths and optimize network performance. The V2V mode of communication may utilize communication channel technologies like DSRC (illustrated as channel E1), Cellular Vehicle-to-Everything (C-V2X), or Wi-Fi (illustrated as channel E2).

The Vehicle-to-Network (V2N) communication mode connects vehicles to network or cloud-based services, providing access to a wide range of information and services for improved driving experiences. This may include access to real-time traffic updates, road conditions, weather forecasts, and navigation assistance. In the illustrated vehicular network 100, the V2N connection A includes communication with a nearby cellular tower 101 which utilizes backhaul connection D to connect to the internet or cloud 106. As shown, multiple cellular towers 101, 102 may be present in an area and represent different communication nodes with which vehicle A can connect. Also shown as a V2N communication mode is connection B with a satellite or other network (e.g., local Wi-Fi) 108, which also utilizes backhaul connection D to communicate with the internet/cloud 106. Backhaul connections D may utilize various technologies, including fiber optic cables, microwave links, satellite connections, and Ethernet connections, which may depend on factors such as distance, bandwidth requirements, and geographic considerations.

As is apparent in such a vehicular network 100, ensuring consistent quality of service (QoS) poses a significant challenge as vehicular environments are dynamic and unpredictable, characterized by rapidly changing traffic conditions, varying network congestion levels, and intermittent connectivity. These factors can lead to fluctuations in data transmission reliability, latency, and bandwidth availability, impacting the overall QoS experienced by vehicles and network components. For instance, in V2N communication, vehicles may experience delays in receiving real-time traffic updates or navigation assistance due to network congestion or limited coverage areas. Similarly, in V2I scenarios, vehicles relying on infrastructure-based services like traffic signal control or road hazard alerts may encounter latency issues if communication with roadside units is disrupted.

Figure 2:
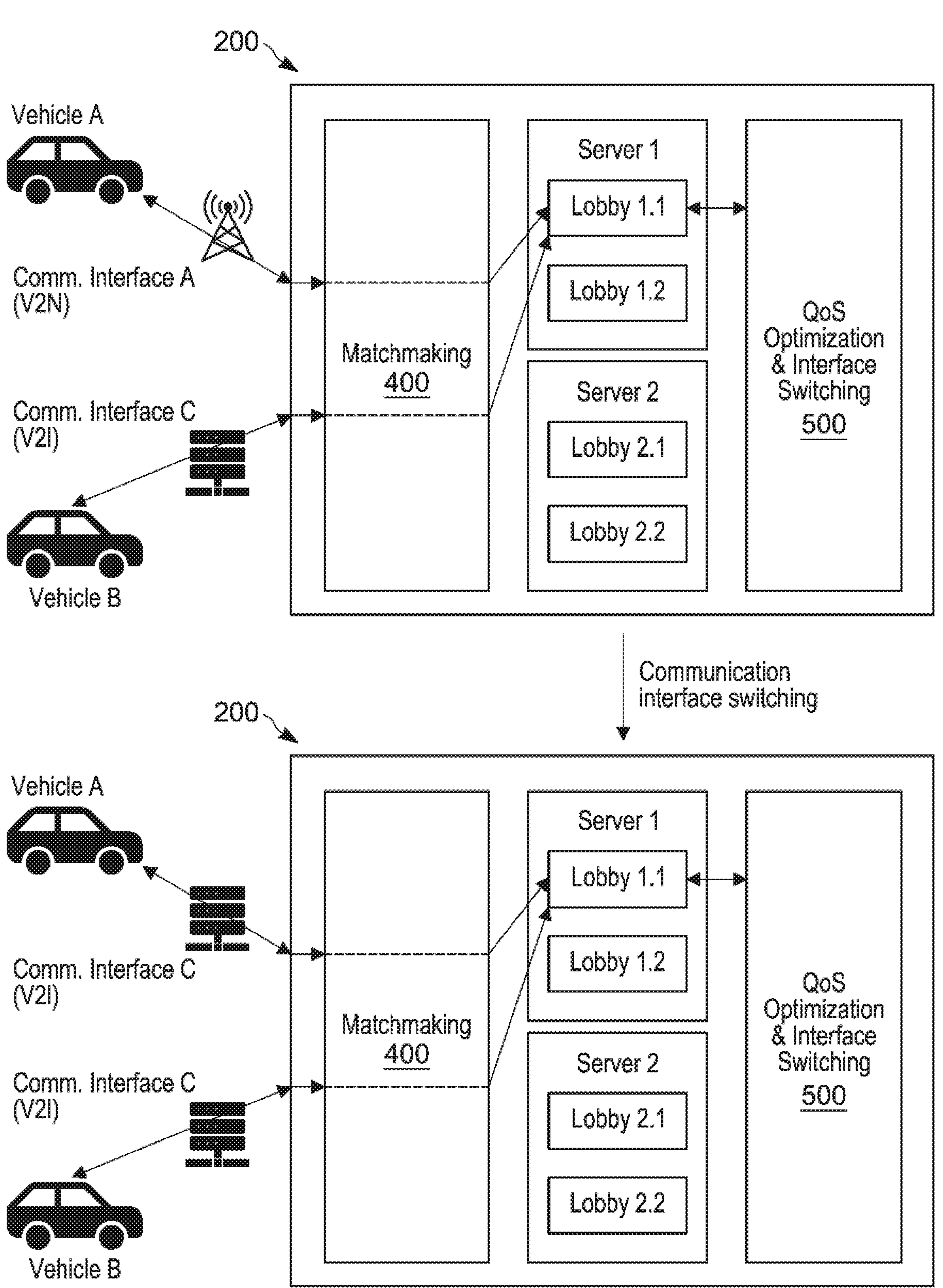
FIG. 2 is a schematic block diagram illustrating an exemplary system and switching process according to an embodiment of the present disclosure.
Figure 3:
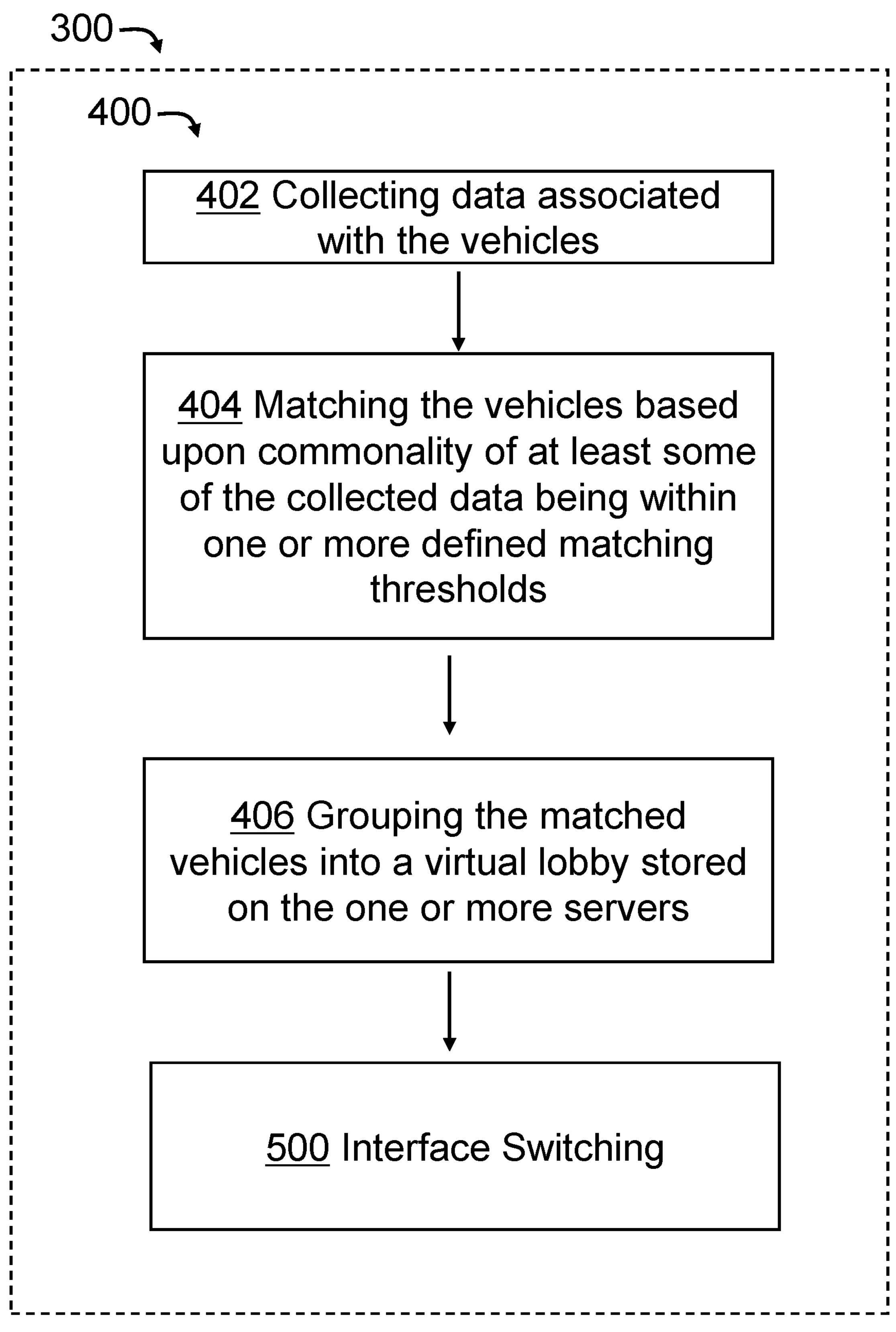
FIGS. 3 and 4 are flow charts illustrating an exemplary method according to an embodiment of the present disclosure.
Figure 4:
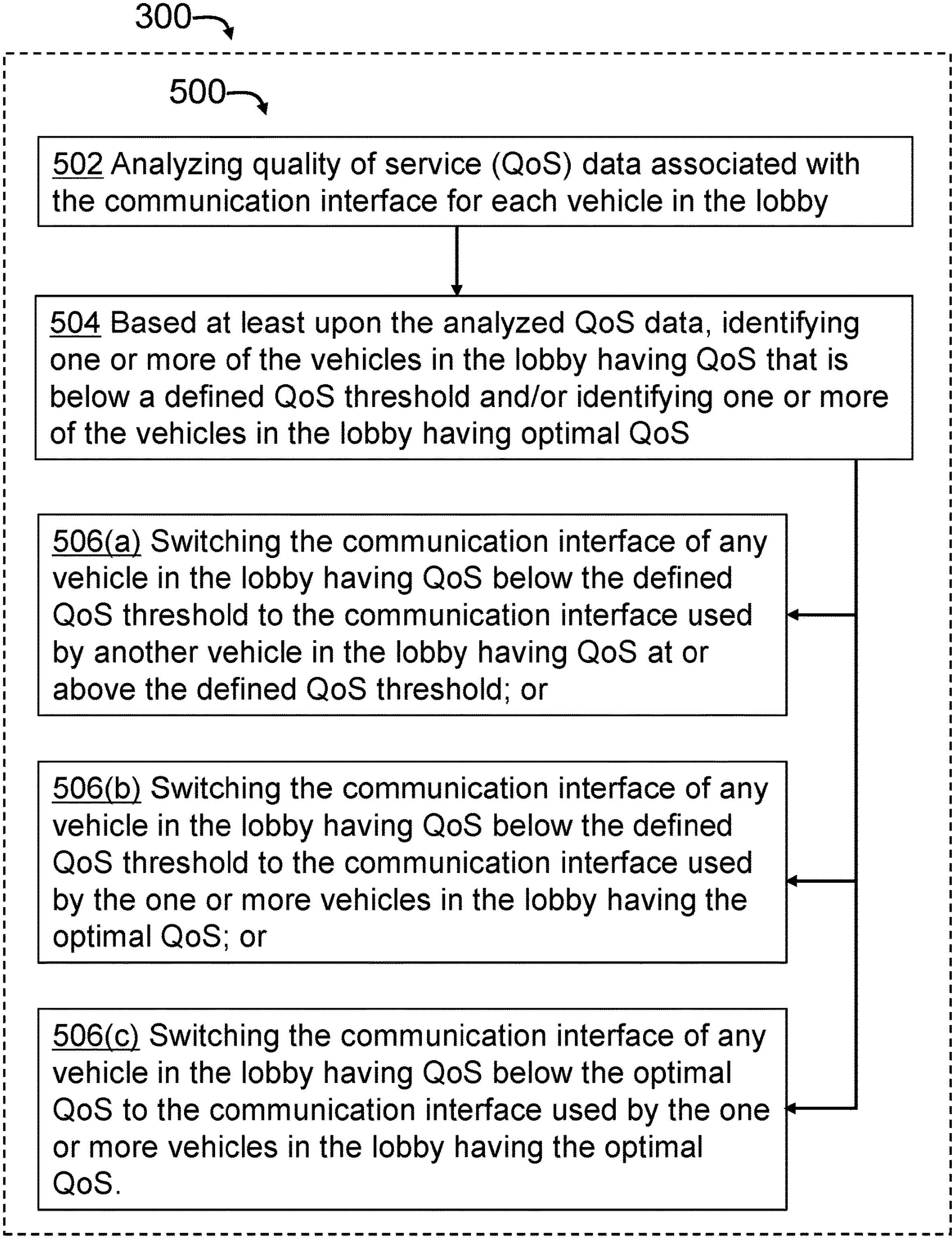

Turning to FIGS. 2-4, an exemplary system 200 and method 300 are shown that solve one or more problems of poor QoS in a vehicular network by using a unique approach of matchmaking and lobbying functionality to optimize QoS for communication of vehicles in the network.

As shown in FIG. 2, the system 200 includes one or more servers (Server 1, Server 2) that are configured to establish communication with vehicles (A, B) via communication interfaces (Communication Interface A, C). The communication interfaces are operably coupled to the one or more servers and are configured to communicate data between the one or more servers and the vehicles. As an example, and also referring back to FIG. 1, Vehicle B may connect to Server 1 via Communication Interface C, which may include a V2I communication mode using a Wi-Fi communication channel to a roadside unit (RSU) serving as a communication node. The RSU may be connected to Sever 1 via any suitable communication hardware, such as via wired or wireless technologies as described above. Vehicle A may connect to Server 1 via Communication Interface A, which may include a V2N communication mode using a cellular communication channel to a cellular tower serving as a communication node, for example. Although system 200 is illustrated as being separate from the vehicles and communication elements (e.g., RSUs, cellular towers, etc.), it is understood that the overall system 200 may include the electronic circuitry and other components of these elements or any other elements in the network 100 (FIG. 1) for performing the functions described herein.

The server(s) of the system 200 (e.g., Server 1, Server 2) may be physical or virtual and may be local or remote. Physical servers are tangible hardware devices that include hardware such as processors (CPUs), memory (e.g., RAM), storage drives (e.g., HDD or SSD), network interfaces, power supplies, cooling systems, or other peripherals. Virtual servers, on the other hand, are software-based instances that run on physical server hardware using a virtualization layer. Virtualization allows multiple virtual servers (also known as virtual machines or VMs) to run on a single physical server, sharing its resources. Each virtual server operates as if it were a standalone physical server, with its own operating system, applications, and configuration.

Figure 5:
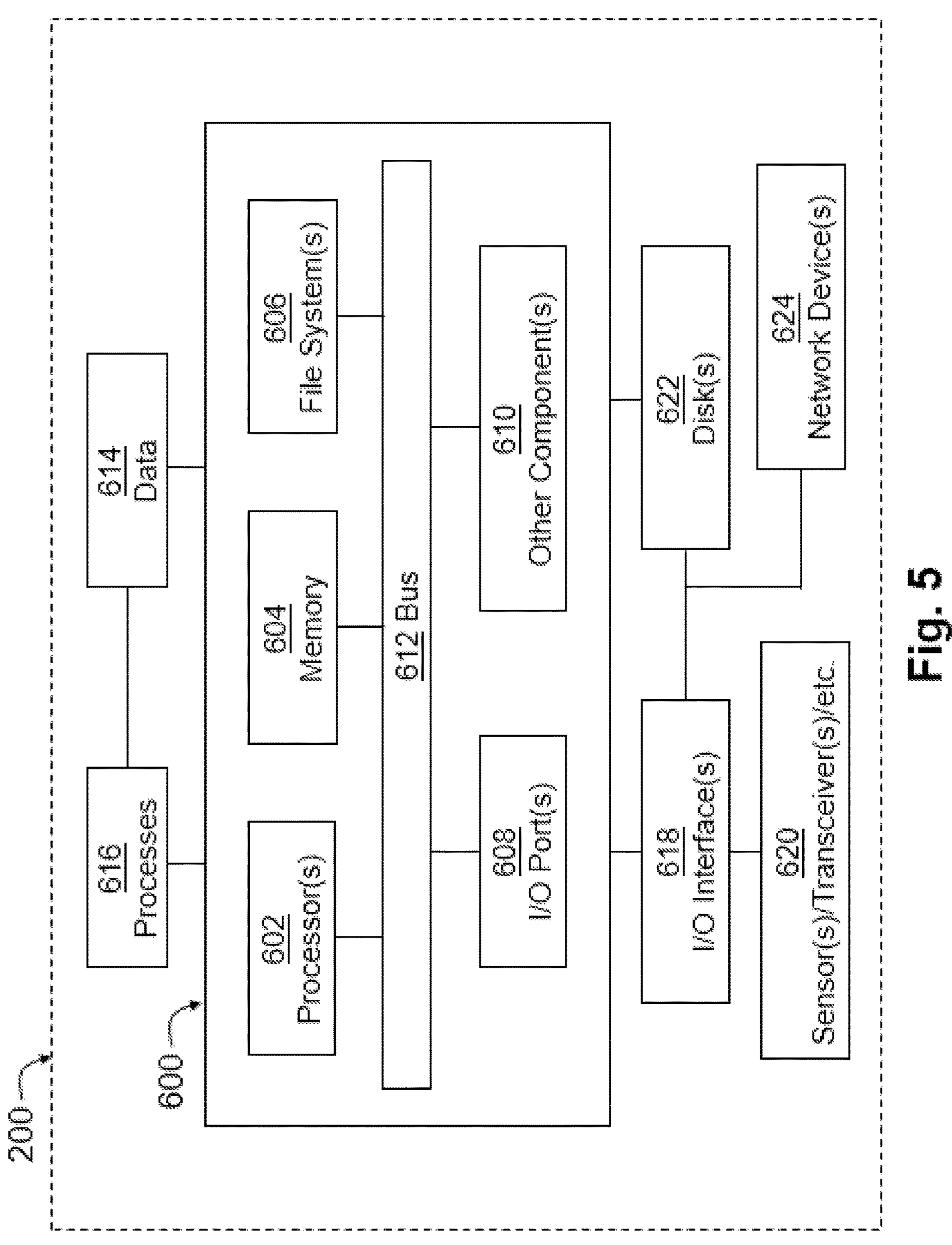
FIG. 5 is a schematic block diagram of a computing machine that is configured according to the system and/or method of the present disclosure.

The system 200 includes memory having executable instructions stored thereon, and one or more processors operably coupled to the memory. The one or more processors are configured to execute the instructions stored on the memory to perform the method 300, including matchmaking steps 400 (also shown as matchmaking module 400 in FIG. 2) and interface switching steps 500 (also shown as QoS optimization and interface switching module 500 in FIG. 2), which are described in further detail below. The memory and processor(s) may be provided via any suitable hardware and circuitry and may be located at any suitable location of the system 200. For example, the memory and processor(s) may be part of the one or more servers of the system 200 (e.g., Server 1, Server 2), or may be a separate interconnected server or other computing machine(s). An example of a computing machine 600 including memory 604 and processor(s) 602 that can perform at least part of the method 300 is illustrated in FIG. 5 and described in further detail below, which such machine 600 may be embodied as a server of the system 200, for example.

Referring to FIG. 3, in conjunction with FIGS. 1 and 2, the method 300 of optimizing QoS of vehicle communications in the network may begin with step 402, including collecting data associated with vehicles in the network. An example of such data collection is shown in FIG. 2, with the system 200 collecting data from Vehicle A via Communication Interface A (e.g., V2N) and collecting data from Vehicle B via Communication Interface B (e.g., V2I). This information may be stored in memory located anywhere in system 200 for use in performing further steps of method 300. As described above, the data from vehicles in V2I mode typically is collected by roadside units (RSUs) or infrastructure components installed along roadways, and in V2N mode may be collected by cellular towers, satellites, or the like. Once collected, this data can be transmitted to a central collection server or network operations center for further processing and analysis. The collection server may server as a centralized hub where data from multiple RSUs and other sources within the V2X ecosystem are aggregated and stored. From the collection server, the data can be distributed to other servers or systems within the network for various purposes, including the exemplary method steps 300, as well as traffic management, congestion monitoring, incident detection, intelligent transportation system applications, or the like. This may involve communication with cloud-based servers, backend servers, or other components of the V2X infrastructure.

The data associated with the vehicles in the network that is collected may include, but is not limited to, navigational data of the vehicles. The navigational data may include geographical location of the vehicles and/or the geographical destination of the vehicles. The navigational data also may include one or more of speed of the vehicles, heading of the vehicles, traveled or planned route of the vehicles, the quality of the traced route and/or options of different traces based on the quality ranking, distance between the vehicles and a geographical coordinate, timestamps associated with geographical coordinates, information about obstacles or hazards on the road or that may interfere with communications (e.g., tall buildings), information about the geography or topography (e.g., mountainous areas), weather conditions, or the like. Other data associated with the vehicle may include its estimated time of departure and/or estimated time of arrival. The data associated with the vehicles also may include their communication hardware, such as certain types of connectivity capabilities (e.g., 3G, 4G, or 5G), or data about the type of vehicle (e.g., commercial trucks, light passenger vehicles, motorcycles, or the like). For example, an SUV with high-mounted antenna may be expected to have better communications performance. Other data associated with the vehicle may include registered opt-in intent to be part of the system 200 and to run its method 300 and/or vehicle network subscription (MNO) information. In addition, data associated with the vehicle that may be used by system 200 may include preferred interest groups (e.g., based on commonly frequented destinations, geographic areas, or other social interests, allowing for better automated detection of intent in order to aid in the formation of a dynamic driving group). Such data may be stored in memory on a computer of the vehicle or accessed to a remotely stored file through the network infrastructure/server, may be input by a user, or may be detected by the system 200.

In exemplary embodiments, the data associated with the vehicle that is collected by the system 200 includes geographical location and/or destination of the vehicle. In a vehicular network, determining the geographical location or destination of a vehicle is typically achieved using Global Navigation Satellite Systems (GNSS) such as the Global Positioning System (GPS). GPS receivers installed in vehicles receive signals from orbiting satellites to calculate the vehicle's exact position. These coordinates are then transmitted over the network, allowing other vehicles, infrastructure elements, or network services to access the vehicle's location information. The geographical location of the vehicle may be its precise coordinates (e.g., longitude and latitude) indicating where the vehicle is situated on Earth's surface, or may be a region around such a precise location within defined limits (e.g., within a five-mile radius of the vehicle's precise location). Similarly, the geographical destination of a vehicle may be its destination defined by precise geographical coordinates (e.g., longitudinal and latitude), or may be a region around such a precise location within defined limits. These defined geographical limits, or boundaries, may be predefined or may be dynamically adapted based on the state of the system 200.

At step 404, the system 200 matches the vehicles based at least upon commonality of at least some of the collected data being within one or more defined matching thresholds. This matching step may include identifying potential vehicle matches based upon the defined criteria of commonality and then evaluating the matches to ensure they meet the criteria within the threshold(s). This information may be stored in memory of system 200 for use in performing further steps of method 300. An example of such matchmaking is shown in FIG. 2 via matchmaking module 400 of system 200, which may be a standalone dedicated matchmaking server having matchmaking instructions according to method 300, or a virtual matchmaking server on one of the servers (Server 1 or Server 2) having such instructions, or may be a matchmaking algorithm stored as instructions on memory of the system 200.

As an example, the commonality of the collected data from the vehicles may include a common geographical location of the vehicles, which may include Vehicles A and B being in the same geographical region of each other, such as within a matching threshold of a 10-mile radius of each other, for example. This common geographical location may include common starting points during a route, common partial paths to occur during a planned route, a common location within at least part of the planned route, or the like. Alternatively or additionally, the commonality of the collected data from the vehicles may include a common geographical destination of the vehicles such as the same precise geographical destination or the geographical destination of the vehicles being within defined geographical region relative to each other. These examples are not limiting, and such commonality of the data also may include the same or similar connection capabilities of the vehicles, the same types of vehicles, etc. The defined matching thresholds establishing the commonality may be predefined (e.g., static) or may be dynamically modified depending on the vehicular environment and/or system environment. Other factors also may be considered during the matching step, such as the number of vehicles, map preferences, or the like.

At step 406, the system 200 groups the matched vehicles into a virtual lobby stored on the one or more servers. An example of this is shown in FIG. 2 in which the matchmaking module 400 has matched the vehicles based on the collected data and algorithms, and the system 200 has grouped Vehicles A and B into Lobby 1.1 on Server 1. Each server of the system may have one or more lobbies. As shown in FIG. 2, for example, Server 1 includes Lobby 1.1 and Lobby 1.2, and Server 2 includes Lobby 2.1 and Lobby 2.2. As mentioned previously, one or more of the servers of the system 200 may be virtual and/or one or more of the servers of the system 200 may be physical. The information relating to the grouping of matched vehicles may be stored on memory of system 200 for use in performing further steps of method 300.

The one or more lobbies of the system 200 may be already existing on the server(s) or may be created dynamically for the purpose of grouping. Lobbies also may be dynamically created or destroyed based on demand. The grouping step may be automatic or may be manual. For example, when automatically grouped into a lobby, the vehicles may be notified that they have been placed in the lobby, or the system may request authorization from the vehicle or user to be added to the lobby. The grouping step also may include presenting a list of lobbies based on the matching criteria, and a user of the vehicle may manually select which lobby to join. In some embodiments, one or more of the vehicles could be grouped into multiple different lobbies based on different matching criteria of the collected vehicle data. In addition, the system may continuously monitor the lobby queue for additional vehicles (for example, until the lobby is filled), and may employ load balancing techniques to group vehicles into different lobbies based on demand.

It is understood, of course, that the actual physical vehicles are not being matched and grouped into virtual lobbies, but rather virtual instances of such vehicles have been created in the form of data and these virtual instances (data) corresponding to the vehicles are being matched, grouped, and the like. For the sake of clarity and simplicity, the term “vehicle” or “vehicles” is used in the present disclosure to refer to both the actual vehicles and their corresponding virtual instances, and the context of the action will dictate whether an actual vehicle or virtual instance of such vehicle applies.

Turning to FIG. 4, the method 300 continues with step 502, including analyzing quality of service (QoS) data associated with the communication interface for each vehicle grouped into the lobby. This QoS data analysis step includes assessing and evaluating the quality of service provided by the communication interface of each vehicle, which may involve monitoring and measuring the various performance parameters (e.g., packet loss, latency, jitter, throughput, bandwidth, reliability, etc.) to determine how well the communication interface is performing. An example is shown in FIG. 2 via QoS Optimization & Interface Switching module 500 of system 200, which may be a standalone dedicated QoS optimization and interface switching server having instructions according to method 300, or a virtual QoS optimization and interface switching server on one of the servers (Server 1 or Server 2) having such instructions, or may be a QoS optimization and interface switching algorithm stored as instructions on memory of the system 200. The QoS analysis step may include determining one or more QoS metrics for the communication interface of each vehicle, which such QoS metric(s) may be based upon any suitable QoS parameter or combination of QoS parameters, in which some QoS parameters may be weighted greater than others in defining the QoS metric(s). The results of the QoS analysis may be stored on memory of system 200 for use in performing further steps of method 300.

At step 504, based at least upon the analyzed QoS data in step 502, the system 200 identifies one or more of the vehicles in the lobby having QoS that is above, at, or below a defined QoS threshold and/or identifies one or more of the vehicles in the lobby having optimal QoS. The defined QoS threshold may be based upon any suitable QoS parameter or combination of QoS parameters, such as packet loss, latency, jitter, throughput, bandwidth, reliability, etc., as described above. Such QoS parameters may be weighted greater than others in defining the QoS threshold. For example, latency may be more important than packet loss, which may be more important than bandwidth, which may be more important than throughput (speed), which may be more important than jitter, and the QoS threshold may be defined based on weighting the importance of such parameters. The defined QoS threshold also may be static (e.g., predefined) or may be dynamic based upon the demands of the system 200 or a particular need. For example, in some situations latency may be the most important parameter, but in other instances bandwidth may be more important than latency, and thus the defined QoS threshold may be dynamically updated by the system 200 to account for these demands.

To identify optimal QoS of the communication interfaces of the vehicles in the lobby at step 504, this identification step may further include analyzing or assessing the communication interface QoS performance of each vehicle in the lobby relative to each other. This may include an ordering or ranking of the QoS performance for the communication interface of each vehicle in the lobby. As an example, if ten vehicles are in the lobby (grouped by common geographical location, for example), the identification of optimal QoS may determine the QoS metric or QoS parameter(s) for the communication interface of each vehicle in the lobby (e.g., latency), and may order or rank these ten vehicles from the best QoS parameter/metric of its communication interface (e.g., lowest latency) to worst QoS parameter/metric of its communication interface (e.g., highest latency). Some vehicles may have the same or similar QoS parameter/metric and may be tied in their rankings, such as tied for best or worst. Similarly to defining the QoS threshold, defining the optimal QoS may be based upon any suitable QoS parameter or combination of QoS parameters, which may be weighted. The defined optimal QoS also may be dynamically based upon the demands of the system 200 or a particular need for a particular situation. Thus, during the identifying step, the QoS data can be analyzed, and the quality parameter/metric can be adjusted dynamically based upon what the group of vehicles in the lobby may need to accomplish at that moment or in the future.

Because the vehicles in the lobby have been grouped based upon a common characteristic, such as a common geographical location, the system 200 may assume that the optimal or better QoS performance of communication interface(s) for certain vehicle(s) in the lobby may be applicable to improve the QoS performance of communication interface(s) for other vehicle(s) in the lobby having poorer QoS. This assumption may be programmed as one of a set of conditions, which can be tested by the system and changed based up on the data retrieved and the dynamic nature of the environment.

As an example, referring to FIG. 2, Vehicles A and B may be driving in the same geographical region and are grouped into Lobby 1.1 of Server 1 via the matchmaking process 400. Vehicle A is connected to Lobby 1.1 with a communication interface including a V2N mode of communication, and Vehicle B is connected to Lobby 1.1 with a communication interface including a V2I mode of communication. The QoS optimization process 500 determines that the QoS of the V2N mode of Vehicle A is poorer than the QoS of the V2I mode of Vehicle B. The assumption, therefore, may be that because the vehicles are in the same geographical region, switching Vehicle A to a V2I mode of communication the same as Vehicle B will improve the QoS of communication of Vehicle A. As noted above, the system 200 may use many different forms of data, conditions, parameters, or the like for assessing and determining QoS, and thus the system 200 and method 300 described herein are not limited to this example.

At steps 506(*a*)-(*c*), the system 200 performs switching of the communication interface of one or more vehicles in the lobby having lower QoS to the communication interface used by one or more vehicles in the lobby having higher QoS. This switching process may include commanding the affected vehicle(s) to disconnect from the undesirable communication interface and connect to the desired communication interface. The switching may require user acceptance to switch, or the command may be automatic without user intervention. The switching process also includes establishing the connection with the desired communication interface, and may include migrating relevant vehicle data and state to the selected communication interface. The switching process may have intervals where the vehicle or reference information is changed during the journey because that particular section has a better quality of service.

Step 506(*a*) illustrates one option of the switching step, including switching the communication interface of any vehicle in the lobby having QoS below the defined QoS threshold to the communication interface used by another vehicle in the lobby having QoS at or above the defined QoS threshold. This can include the switching of one, or some, or all of the vehicles in the lobby having QoS below the QoS threshold to that of the communication interface(s) of one or more other vehicle(s) having the better QoS as may be determined based on the state of the system 200. As an example, ten vehicles are in the lobby in which the QoS threshold is defined by latency of better than 50 ms, and four of these vehicles have QoS above this threshold (lower than 50 ms), of which one of these vehicles has a V2I connection using DRSC and the other three have a V2I connection using Wi-Fi. The six other vehicles below the threshold (at 50 ms or greater) have a V2N mode of communication. These six vehicles are switched to either V2I DRSC or V2I Wi-Fi, which may be based on other factors such as bandwidth.

Step 506(*b*) illustrates another option of the switching step, including switching the communication interface of any vehicle in the lobby having QoS below the defined QoS threshold to the communication interface used by the one or more vehicles in the lobby having the optimal QoS. This can include the switching of one, or some, or all of the vehicles in the lobby having QoS below the QoS threshold to that of the communication interface used by the vehicle(s) having the optimal QoS as may be determined based on the state of the system 200. As an example, ten vehicles are in the lobby in which the QoS threshold is defined by latency of better than 50 ms, and four of these vehicles have QoS above this threshold (lower than 50 ms), of which one of these vehicles has a V2I connection using DRSC and the other three have a V2I connection using Wi-Fi. The one vehicle with DRSC has a lower latency than the three other vehicles using Wi-Fi and this one vehicle is determined to have the optimal QoS. The six vehicles below the threshold (at 50 ms or greater) are connected by V2N cellular and are switched to V2I DRSC. The three vehicles above the QoS threshold connected by V2I Wi-Fi also may be switched to V2I DRSC as may be determined by the state of the system including factors such as demand.

Step 506(*c*) illustrates another option of the switching step, including switching the communication interface of any vehicle in the lobby having QoS below the optimal QoS to the communication interface used by the one or more vehicles in the lobby having the optimal QoS. This can include the switching of one, or some, or all of the vehicles in the lobby having QoS below the optimal QoS to that of the communication interface used by the vehicle(s) having the optimal QoS as may be determined based on the state of the system 200. As an example, ten vehicles are in the lobby with one of these vehicles connected by V2I DRSC, three connected by V2I Wi-Fi, and six connected by V2N cellular. The one vehicle connected by V2I DRSC is determined to have the optimal QoS, and the other nine vehicles are switched to the V2I DRSC communication interface.

After the switching step 506, the system 200 and method 300 may test the communication interface switch of the affected vehicle(s) to determine if QoS of communications is improved. This comparison may include analyzing the current QoS parameter(s)/metric(s) against the previous QoS parameter(s)/metric(s). If the switch affecting one or more of the vehicle(s) did not improve QoS, the system may revert back to the previous communication interface, or may try an additional communication interface associated with another of the vehicles in the lobby. For example, in another attempt at switching, the system 200 may switch to the next best communication interface as determined according to the ranking based on the QoS parameter(s)/metric(s) utilized. This process of testing the switch may repeat, such as in a tiered-down approach of the rankings, until a suitable communication interface with improved QoS is found.

The system 200 and method 300 also may correlate the QoS analysis to the collected data and store this correlated data for future use by the system to enhance efficiency during the QoS analysis step or the switching step. For example, if a particular geographical location (e.g., a particular mountainous region) usually has optimal QoS associated with a particular communication interface (e.g., V2I), then the correlation of this data may be used by the system to weight or rank that communication interface (e.g., V2I) as one to try in the switching step if the vehicles are located in that geographical region. Such correlation of data may be used with any parameter of data associated with the vehicles as collected in step 402.

The system 200 and method 300 also may monitor QoS for all vehicles in the lobby, and if QoS for any vehicle deteriorates below the QoS threshold or to a non-optimal QoS during its route, then the steps of the QoS optimization and communication interface switching process 500 may be repeated. This monitoring may be continuous or periodic, for example by sending a ping for communication quality testing. This real-time QoS data analysis for the vehicles in the lobby enables dynamically adapting the switching of the communication interface to the optimal communication interface or to a communication interface above the defined threshold.

The system 200 and method 300 also may monitor the data associated with the vehicles in the lobby that provided the matchmaking into the lobby, such as their geographical location and/or a geographical destination, and then assess whether the matchmaking criteria is still satisfied. For example, if Vehicle A and Vehicle B diverge from each other in geographical location during their respective routes and should no longer be matched, then the system may rerun the matchmaking process 400 for Vehicle A and/or Vehicle B. The removal of the vehicle(s) in the lobby also may be based on server demand, vehicle intent (manual removal), change in vehicle route intent or satisfaction (arriving at destination), predetermined timeout, or the like. Such monitoring may be continuous or periodic, and enables dynamically adapting the matching of the vehicles in the lobby so that additional vehicles are added to the lobby and/or vehicles in the lobby are removed.

The system 200 and method 300 also may use the lobby to provide communication between the vehicles in the lobby. This may include communication via the switched to communication interface(s) (i.e., the optimal or above-threshold communication interface(s)) which may be via the one or more servers. For example, the communication between vehicles in the lobby may be direct communication (e.g., V2V) or indirect communication (e.g., V2N or V2I).

An example of communication between vehicles in the lobby may include sharing navigational data such as the geographical location of the vehicles in the lobby and/or related to the geographical destination of the vehicles in the lobby. For example, this may include sending alerts to vehicle(s) in the region or behind in a particular route of possible road hazards or incidents the system 200 has found. In this manner, the vehicles in the lobby can share information throughout the trip of any event concerning their current geographical destination and/or arrival at the defined geographical destination. vehicles share information throughout the trip of any event concerning the arrival of the defined destination.

Another example of communication between vehicles in the lobby may include defining a better route. For example, the system 200 may search for the best route based on expert users with good V2I interaction (B); the current vehicles going to that route will feed the server with updated information to Vehicle A to find a better route and make the necessary changes.

The system 200 and method 300 also may provide communication of vehicles in different lobbies (e.g., between Lobby 1.1 and Lobby 1.2, Lobby 2.1, and/or Lobby 2.2), which may assist for navigational purposes, for example. For example, if one group of vehicles are located in a first geographical location and grouped into a first lobby, they may communication with a second group of vehicles located in a different second geographical location that are grouped into a second lobby. Both groups in the first and second lobbies may be traveling to the same geographical destination and may share data and/or may communicate with each other for navigation.

The system 200 and method 300 also may analyze and compare QoS parameter(s)/metric(s) of the communication interfaces of vehicles in the different lobbies, which may assist in determining optimal QoS at present or in the future. For example, if one group of vehicles in a first lobby is trailing a second group of vehicles in a second lobby along a similar route, the system may utilized the data from the leading (second) group to assist in QoS optimization as the analysis related to geographical region may already have been assessed and stored in memory of the system.

The system 200 and method 300 also may store lobbies on the one or more servers, and vehicles in the network can join these lobbies (manually or automatically).

For example, each stored lobby may store data related to previous optimal communication interfaces to preselect or optimize the analyzing of QoS data for selecting the desired communication interface. As an example, a Vehicle B using a V2I communication in a particular geographical location which has joined a lobby associated with that location and has particularly optimal QoS may have its data stored in the lobby so that the system knows that at this geographical location the V2I mode of communication may be a preferred for the communication interface and may be tried first during QoS optimization.

As another example, the stored lobbies may include stored rating data related to previous vehicles or routes that can be accessed by vehicles in the vehicular network to provide a different route for the same destination. This may enable optimization of the choice of routes of the vehicles. For example, if Vehicle A defines a destination, the system 200 (which may be at least partially cloud-based) may search for the best route based on expert users with good communication interface interaction, and the current vehicles going to that route will feed the system with updated information to Vehicle A to find a better route and make changes to the route.

The system 200 and method 300 described herein may be extensive and dynamic, and thus the foregoing examples in the present disclosure are merely exemplary and the system and method according to the present disclosure are not limited thereto. For example, although described above in the context of ground-based vehicles, it is understood that the system and method according to the present disclosure also may be applicable to other vehicles, such as aerial vehicles (e.g., drones), watercraft (e.g., boats), or the like. In addition, although described above in the context of vehicles with onboard/built-in communication capabilities, including associated electronic circuitry, it is also understood that the exemplary system and method may be applicable to the use of mobile phones used in vehicles for navigation or communication purposes during travel.

It is understood that the exemplary system 200 described herein may utilize one or more components of any suitable electronic circuity which may be located at one or more suitable locations within the system for performing the exemplary process(es) described herein. The term "circuitry" as used herein may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

"Logic," as used herein, includes but is not limited to hardware, firmware, software or combinations of each to perform a function(s) or an action(s), or to cause a function or action from another logic, method, or system. This logic may be used to develop "algorithm(s)", which is a step-by-step procedure or set of instructions designed to solve a specific problem or accomplish a particular task.

In the flow diagram(s), blocks denote "processing blocks" that may be implemented with logic. The processing blocks may represent a method step or an apparatus element for performing the method step. A flow diagram does not depict syntax for any particular programming language, methodology, or style (e.g., procedural, object-oriented). Rather, a flow diagram illustrates information one skilled in the art may employ to develop logic to perform the illustrated processing. As such, the particular step-by-step sequence of the processing blocks illustrated in the flow diagram(s) may represent an exemplary form of algorithm for performing the method(s). It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques. Methodologies in the flow diagram(s) or otherwise described herein may be implemented as processor executable instructions or operations provided on a computer-readable medium. Thus, in one example, a computer-readable medium may store processor executable instructions operable to perform such a method when executed by at least one processor. In addition, at each step of the method(s) described herein, or within or after each step of such method(s), the processed information may be stored in memory of the system for further processing of information according to the step(s).

Turning to FIG. 5, illustrated is a schematic block diagram of exemplary electronic circuitry and other electronic components and information that may be embodied in a system that is configured to carry out the exemplary process(es) described herein. Such a system includes system 200 and such process(es) includes those in method 300, as described above.

As shown, the system 200 includes at least one electronic computing machine 600 that is configured to perform at least some of the processes according to the present disclosure, including at least some of the processes described in connection with method 300. Such a computing machine 600 may be embodied in one or more of any suitable component(s) of the system 200 which may be located at any suitable location(s). For example, the computing machine 600 or multiple computing machines 600 may be embodied in one or more of the server(s) of the system 200 [OR controller if applicable to different system], such as in the form of a centralized server architecture, multiple distributed server architecture, or the like. Alternatively or additionally, the computing machine(s) 600 may be deployed in other computing architectures of the system, such as in a peer-to-peer architecture (e.g., each vehicle having a computing machine 600 for performing process(es) according to the disclosure), an edge computing architecture (e.g., the local nodes such as RSUs having computing machine(s) 600 for performing processes), or the like. Accordingly, the computing machine 600 alone or in combination with multiple computing machines 600 may be provided in the system 200 and configured to perform the process(es) including method 300 described herein.

In the illustrated embodiment, the computing machine 600 includes one or more processor(s) 602, one or more modules of memory 604, one or more file system(s) 606, one or more I/O Port(s) 608, and (optionally) other electronic system component(s) 610, which are operably connected by a bus 612.

As used herein, an "operable connection," or a connection by which entities are "operably connected," is one in which the entities are connected in such a way that the entities may perform as intended. An operable connection may be a direct connection or an indirect connection in which an intermediate entity or entities cooperate or otherwise are part of the connection or are in between the operably connected entities. An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

The processor(s) 602 execute instructions stored in memory 604 for performing tasks, such as the exemplary process(es) described herein including at least some of the method steps 300. The processor(s) 602 interpret and execute these instructions, manage data flow, and coordinate the operation of other system components. As used herein, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an Application Specific Integrated Circuit, a Digital Signal Processor, a Field Programmable Gate Array, a Programmable Logic Controller, a Complex Programmable Logic Device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices.

The processor 602 can be one or more of a variety of these different processors. A combination of such processors 602 from multiple different computing machines 600 also may work together to execute one or more of the instructions for performing the processes described herein.

The module(s) of memory 604 store data and instructions that the processor(s) 602 can access. This includes both volatile memory, which is used for temporary storage during program execution, and non-volatile memory, which retains data even when the power is turned off. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM). The memory 604 can store an operating system that controls and allocates resources of the computing machine 600. A combination of memory 604 from multiple different computing machines 600 may be used for performing processes described herein.

The file system(s) 606 manage the organization and retrieval of data stored on storage devices. The file system(s) provide a logical structure for storing and accessing files, managing permissions, and handling error correction to ensure data integrity.

The I/O Port(s) 608 facilitate communication between the computing machine 600 and the external environment by allowing data to be transferred in and out of the system, for example enabling input from users and output to peripherals. In this manner, the computing machine 600 may interact with input/output devices via I/O ports 608. Such input/output devices can include, but are not limited to, a keyboard, a microphone, a pointing and selection device, cameras, video cards, displays, disks, network devices, or the like. The I/O Ports 608 can include but are not limited to, serial ports, parallel ports, and USB ports.

The other electronic system component(s) 610 encompass a variety of hardware components that can be used in machine 600. This may include graphics processing units (GPUs) configured to render images and videos, or various sensors or specialized hardware for specific applications.

The bus 612 serves as a communication pathway for data and signals to travel between the processor(s), memory, file system(s), I/O ports, and other electronic components. The bus facilitates the transfer of data between different parts of the system, ensuring that they can work together seamlessly to execute programs and process information effectively. The bus 612 can be a single internal bus interconnect architecture or other bus or mesh architectures. While a single bus is illustrated, it is to be appreciated that computing machine 600 may communicate with various devices, logics, and peripherals using other buses that are not illustrated (e.g., PCIE, SATA, Infiniband, 1394, USB, Ethernet). The bus 612 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

Data 614 serves as the material processed and manipulated by the computing machine 600. It can take various forms, including text, numbers, images, audio, or video. Data is typically stored in memory 604 and managed by the file system(s) 606. When a process requires data, the processor(s) 602 fetch the necessary information from memory 604 via the bus 612, execute the instructions on the data, and perform computations, transformations, or other operations. The processed data may be stored back in memory 604 or transmitted to output devices via the I/O port(s) 608 for further use or display.

Processes 616 represent the series of instructions or tasks executed by the computing machine 600 to achieve specific goals or outcomes. This can include one or more step(s) of the exemplary method 300 described above. Processes are initiated by the processor(s) 602, which fetch instructions from memory 604 and execute them. These instructions may involve manipulating data stored in memory, interacting with input/output devices via the I/O port(s) 608, or performing complex calculations or computations. Once a process is completed, the results may be stored back in memory, output to external devices, or used as input for subsequent processes, forming a continuous cycle of computation and data manipulation within the computing machine.

I/O interface(s) 618 may be a hardware component (such as a card or other electronic device) that can be connected to the I/O ports 608 of the computing machine 600. The I/O interfaces(s) 618 may serve as the intermediary between the computing machine 600 and external devices, facilitating communication and data transfer. This can include functions such as data transfer, communication protocol transfer, signal conditioning, buffering, interrupt handling, and controlling or configuring the operably attached devices.

To facilitate the collection of data 614 for use by the computing machine 600, the system may utilize suitable electronic circuitry 620, such as suitable sensor(s), transceiver(s), or the like, which can be operably connected to the computing machine 600 via the I/O interface(s) 618 or the I/O port(s) 608. Sensors, such as GPS sensor(s), speed sensor(s), position sensor(s), inertial (IMU) sensor(s), or the like, may be used for collecting data (such as vehicle data) as described above, which these sensor(s) may be located onboard the respective vehicles in the network. The transceiver(s), such as a Wi-Fi transceiver, cellular transceiver, or the like, is configured to send and receive data, which such transceivers also may be located onboard the respective vehicles.

One or more disk(s) 622 may be operably connected to the computing machine 600 via the I/O Interface(s) 620 or the I/O Port(s) 608. The disk(s) 622 can include, but is not limited to, devices like a magnetic disk drive, a solid-state disk drive, a floppy disk drive, a tape drive, a Zip drive, a flash memory card, or a memory stick. Furthermore, the disk 622 can include optical drives like a CD-ROM. Like memory 604, the disk(s) 622 can store data or instructions for use by the processor 602, including an operating system that controls and allocates resources of the computing machine 600.

The computing machine 600 can operate in a network environment and thus may be operably connected to network device(s) 624 via the I/O Interface(s) 618 or the I/O port(s) 608. Through the network device(s) 624, the computing machine 600 may interact with a network. Through the network, the computing machine 600 may be logically connected to remote devices. The networks with which the computing machine 600 may interact include, but are not limited to, a local area network (LAN), a wide area network (WAN), or other networks. The network device(s) 624 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4), or the like. Similarly, the network device(s) 624 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

According to an aspect, a system for optimizing quality of service (QoS) of vehicle communications, including: one or more servers configured to establish communication with vehicles; communication interfaces operably coupled to the one or more servers, the communication interfaces being configured to communicate data between the one or more servers and the vehicles; memory having executable instructions stored thereon; one or more processors operably coupled to the memory, the one or more processors being configured to execute the instructions to perform a process including the steps: (i) collecting data associated with the vehicles; (ii) matching the vehicles based upon commonality of at least some of the collected data being within one or more defined matching thresholds; (iii) grouping the matched vehicles into a virtual lobby stored on the one or more servers; (iv) analyzing quality of service (QoS) data associated with the communication interface for each vehicle in the lobby; (v) based at least upon the analyzed QoS data, identifying one or more of the vehicles in the lobby having QoS that is below a defined QoS threshold and/or identifying one or more of the vehicles in the lobby having optimal QoS; and (vi) (a) switching the communication interface of any vehicle in the lobby having QoS below the defined QoS threshold to the communication interface used by another vehicle in the lobby having QoS at or above the defined QoS threshold; or (b) switching the communication interface of any vehicle in the lobby having QoS below the defined QoS threshold to the communication interface used by the one or more vehicles in the lobby having the optimal QoS; or (c) switching the communication interface of any vehicle in the lobby having QoS below the optimal QoS to the communication interface used by the one or more vehicles in the lobby having the optimal QoS.

According to another aspect, a method controlled by one or more processors for optimizing quality of service (QoS) of vehicle communications, the method including: (i) collecting data associated with vehicles; (ii) matching the vehicles based upon commonality of at least some of the collected data being within one or more defined matching thresholds; (iii) grouping the matched vehicles into a virtual lobby stored on the one or more servers; (iv) analyzing quality of service (QoS) data associated with the communication interface for each vehicle in the lobby; (v) based at least upon the analyzed QoS data, identifying one or more of the vehicles in the lobby having QoS that is below a defined QoS threshold and/or identifying one or more of the vehicles in the lobby having optimal QoS; and (vi) (a) switching the communication interface of any vehicle in the lobby having QoS below the defined QoS threshold to the communication interface used by another vehicle in the lobby having QoS at or above the defined QoS threshold; or (b) switching the communication interface of any vehicle in the lobby having QoS below the defined QoS threshold to the communication interface used by the one or more vehicles in the lobby having the optimal QoS; or (c) switching the communication interface of any vehicle in the lobby having QoS below the optimal QoS to the communication interface used by the one or more vehicles in the lobby having the optimal QoS.

According to another aspect, a non-transitory computer readable medium storing program code which when executed by one or more processors performs at least the steps: (i) collecting data associated with vehicles; (ii) matching the vehicles based upon commonality of at least some of the collected data being within one or more defined matching thresholds; (iii) grouping the matched vehicles into a virtual lobby stored on the one or more servers; (iv) analyzing quality of service (QoS) data associated with the communication interface for each vehicle in the lobby; (v) based at least upon the analyzed QoS data, identifying one or more of the vehicles in the lobby having QoS that is below a defined QoS threshold and/or identifying one or more of the vehicles in the lobby having optimal QoS; and (vi) (a) switching the communication interface of any vehicle in the lobby having QoS below the defined QoS threshold to the communication interface used by another vehicle in the lobby having QoS at or above the defined QoS threshold; or (b) switching the communication interface of any vehicle in the lobby having QoS below the defined QoS threshold to the communication interface used by the one or more vehicles in the lobby having the optimal QoS; or (c) switching the communication interface of any vehicle in the lobby having QoS below the optimal QoS to the communication interface used by the one or more vehicles in the lobby having the optimal QoS.

Exemplary embodiment(s) may include one or more of the following additional features combined with any of the foregoing aspects, in which one or more of these additional features may be combined separately or in any suitable combination with each other.

In exemplary embodiment(s), the collecting data includes collecting navigational data associated with the vehicles.

In exemplary embodiment(s), the matching includes matching the vehicles based upon commonality of the navigational data.

In exemplary embodiment(s), the collecting navigational data includes collecting geographical location and/or geographical destination of the vehicles.

In exemplary embodiment(s), the commonality of the navigational data for the matching includes the vehicles being located within a defined geographical region relative to each other and/or the geographical destinations of the vehicles being within a defined geographical region relative to each other.

In exemplary embodiment(s), the switching the communication interface includes switching one or more of a communication mode, a communication channel, and a communication node.

In exemplary embodiment(s), the analyzing QoS data includes analyzing one or more QoS parameters of latency, packet loss, jitter, throughput, bandwidth, and/or reliability.

In exemplary embodiment(s), the defined QoS threshold or the optimal QoS is based upon the one or more QoS parameters analyzed.

In exemplary embodiment(s), the analyzed QoS data and the defined QoS threshold or the optimal QoS are based on a plurality of QoS parameters that are weighted relative to each other.

In exemplary embodiment(s), the identifying involves identifying one or more of the vehicles in the lobby having optimal QoS.

In exemplary embodiment(s), the analyzed QoS data for each vehicle in the lobby is ranked relative to each other, and the optimal QoS is one or more of the vehicles with the highest ranking.

In exemplary embodiment(s), the switching involves (c) switching the communication interface of any vehicle in the lobby having QoS below the optimal QoS to the communication interface used by the one or more vehicles in the lobby having the optimal QoS.

In exemplary embodiment(s), the switching includes sending at least one command to the one or more vehicles affected by the switch to (i) disconnect from its currently connected communication interface, and (ii) to connect to the communication interface used by the other vehicle in the lobby having QoS at or above the defined QoS threshold, or to connect to the communication interface used by the one or more vehicles in the lobby having the optimal QoS.

In exemplary embodiment(s), the process further comprises: testing the switch by analyzing QoS data associated with the communication interface of the one or more vehicles affected by the switching, and determining whether QoS is above the defined QoS threshold or whether QoS has improved after the switch.

In exemplary embodiment(s), based upon the testing, when the analyzed QoS of the one or more vehicles affected by the switch is below the defined QoS threshold or has not improved, then switching is reattempted to switch to the communication interface used by another of the vehicles above the defined QoS threshold or to the next-best-ranked vehicle below the one or more vehicles having the optimal QoS.

In exemplary embodiment(s), the lobby stores data related to previous optimal communication interfaces to preselect or optimize the analyzing of QoS data.

In exemplary embodiment(s), the process further comprises: monitoring the QoS data for the vehicles in the lobby and dynamically adapting the switching of the communication interfaces by repeating steps (iv) through (vi).

In exemplary embodiment(s), the process further comprises: monitoring the data associated with the vehicles and/or the matchmaking of the vehicles, more particularly including at least the geographical location and/or a geographical destination for each of the-vehicles, and dynamically adapting the grouping of vehicles in the lobby so that additional vehicles are added to the lobby and/or vehicles in the lobby are removed.

In exemplary embodiment(s), the process further comprises: using the switched to communication interface(s) of the one or more vehicles affected by the switching to provide communication between the vehicles in the lobby.

In exemplary embodiment(s), the process further comprises sharing route data related to the geographical location of the vehicles in the lobby and/or related to the geographical destination of the vehicles in the lobby.

In exemplary embodiment(s), the process further comprises: defining different routes based on routes of vehicles in the lobby.

In exemplary embodiment(s), the process further comprises: alerting vehicles in the lobby of obstacles, incidents or hazards based on routes of vehicles in the lobby.

In exemplary embodiment(s), the one or more servers contain a plurality of lobbies and one or more of the vehicles in one of plurality of lobbies can communicate with one or more of the vehicles in another of the plurality of lobbies.

In exemplary embodiment(s), the lobby stores route data on the one or more servers which is accessible by the vehicles to define a different route.

In exemplary embodiment(s), the lobby stores rating data related to previous vehicles in the lobby and/or stores routes of previous vehicles in the lobby that is/are accessible by the vehicles to define a different route.

In exemplary embodiment(s), the route data previously stored or rated is accessible by vehicles in the same lobby or can be accessed by vehicles in other lobbies.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. Thus, while a particular feature may have been described with respect to only one or more of several embodiments, such feature may be combined with one or more other features of the other embodiments, separately or in any combination. The same may also be varied in many ways. Such variations are not to be regarded as a departure from the disclosure, and all such modifications are intended to be included within the scope of the disclosure. as may be desired and advantageous for any given or particular application.

Any background information contained in this disclosure is to facilitate a better understanding of the various aspects described herein. It should be understood that any such background statements are to be read in this light, and not as admissions of prior art. Likewise, the description and examples are presented herein solely for the purpose of illustrating the various embodiments of the disclosure and should not be construed as a limitation to the scope and applicability of the disclosure.

The phrase "and/or" as used in this disclosure should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" as used in this disclosure should be understood as being inclusive and not exclusive. For example, when separating items in a list, "or" or "and/or" shall be interpreted as being inclusive, i.e., the inclusion of at least one, but also including more than one, of a number or list of elements, and, optionally, additional unlisted items. For example, a condition A or B is satisfied by anyone of the following: A is true (or present) and B is false (or not present), A is false (or not present) and B is true (or present), and both A and B are true (or present). Only terms clearly indicating exclusivity should be interpreted as indicating exclusive alternatives (i.e. "one or the other but not both"), such as "either," "only one of," or "exactly one of." In other words, such terms of exclusivity refer to the inclusion of exactly one element of a number or list of elements.

Any references to "one embodiment" or "an embodiment" as used herein is understood to mean that a particular element, feature, structure, or characteristic described in connection with the embodiment is included in at least one embodiment. The appearances of the phrase "in one embodiment" in various places in the specification are not necessarily referring to the same embodiment.

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The word "exemplary" is used herein to mean "serving as an example or illustration." Any aspect or design described herein as "exemplary" is not necessarily to be construed as preferred or advantageous over other aspects or designs. Likewise, the phrases "particularly," "preferably," or the like as used in this disclosure may refer to an element or value that provides preferable advantage(s) in some embodiment(s), however is not intended to limit the scope of the disclosure to those "particular" or "preferable" features.

Transitional language such as "including," "comprising," "having," "containing," "involving," or variations thereof, is intended to be broad and encompass the subject matter listed thereafter, equivalents, and additional subject matter not recited, i.e., to be open-ended and meaning including but not limited to.

Although the invention has been shown and described with respect to a certain embodiment or embodiments, it is apparent that equivalent alterations and modifications will occur to those having ordinary skill in the art upon the reading and understanding this disclosure, and such modifications are intended to be included within the scope of this disclosure as defined in the claims. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure.

What is claimed is:

1. A system for optimizing quality of service (QOS) of vehicle communications, comprising:

one or more servers configured to establish communication with vehicles;

communication interfaces operably coupled to the one or more servers, the communication interfaces being configured to communicate data between the one or more servers and the vehicles;

memory having executable instructions stored thereon;

one or more processors operably coupled to the memory, the one or more processors being configured to execute the instructions to perform a process comprising the steps:

(i) collecting data associated with the vehicles;

(ii) matching the vehicles based upon commonality of at least some of the collected data being within one or more defined matching thresholds;

(iii) grouping the matched vehicles into a virtual lobby stored on the one or more servers;

(iv) analyzing quality of service (QOS) data associated with the communication interface for each vehicle in the lobby;

(v) based at least upon the analyzed QoS data, identifying one or more of the vehicles in the lobby having QoS that is below a defined QoS threshold and/or identifying one or more of the vehicles in the lobby having optimal QoS; and (vi) (a) switching the communication interface of any vehicle in the lobby having QoS below the defined QoS threshold to the communication interface used by another vehicle in the lobby having QoS at or above the defined QoS threshold; or (b) switching the communication interface of any vehicle in the lobby having QoS below the defined QoS threshold to the communication interface used by the one or more vehicles in the lobby having the optimal QoS; or (c) switching the communication interface of any vehicle in the lobby having Qos below the optimal QoS to the communication interface used by the one or more vehicles in the lobby having the optimal QoS.

2. The system according to claim 1, wherein:

the collecting data includes collecting navigational data associated with the vehicles, and the matching includes matching the vehicles based upon commonality of the navigational data.

3. The system according to claim 2, wherein:

the collecting navigational data includes collecting geographical location and/or geographical destination of the vehicles, and the commonality of the navigational data for the matching includes the vehicles being located within a defined geographical region relative to each other and/or the geographical destinations of the vehicles being within a defined geographical region relative to each other.

4. The system according to claim 1, wherein:

the switching the communication interface includes switching one or more of a communication mode, a communication channel, and a communication node.

5. The system according to claim 1, wherein:

the analyzing QoS data includes analyzing one or more QoS parameters of latency, packet loss, jitter, throughput, bandwidth, and/or reliability; and the defined QoS threshold or the optimal QoS is based upon the one or more QoS parameters analyzed;

optionally, wherein the analyzed QoS data and the defined QoS threshold or the optimal QoS are based on a plurality of QoS parameters that are weighted relative to each other.

6. The system according to claim 1, wherein:

the identifying involves identifying one or more of the vehicles in the lobby having optimal QoS;

the analyzed QoS data for each vehicle in the lobby is ranked relative to each other, and the optimal QoS is one or more of the vehicles with the highest ranking; and the switching involves (c) switching the communication interface of any vehicle in the lobby having QoS below the optimal QoS to the communication interface used by the one or more vehicles in the lobby having the optimal QoS.

7. The system according to claim 1, wherein:

the switching includes sending at least one command to the one or more vehicles affected by the switch to (i) disconnect from its currently connected communication interface, and (ii) to connect to the communication interface used by the other vehicle in the lobby having QoS at or above the defined QoS threshold, or to connect to the communication interface used by the one or more vehicles in the lobby having the optimal QoS.

8. The system according to claim 1, wherein the process further comprises:

testing the switch by analyzing QoS data associated with the communication interface of the one or more vehicles affected by the switching, and determining whether QoS is above the defined QoS threshold or whether QoS has improved after the switch.

9. The system according to claim 8, wherein:

based upon the testing, when the analyzed QoS of the one or more vehicles affected by the switch is below the defined QoS threshold or has not improved, then switching is reattempted to switch to the communication interface used by another of the vehicles above the defined QoS threshold or to the next-best-ranked vehicle below the one or more vehicles having the optimal QoS.

10. The system according to claim 1, wherein:

wherein the lobby stores data related to previous optimal communication interfaces to preselect or optimize the analyzing of QoS data.

11. The system according to claim 1, wherein the process further comprises:

monitoring the QoS data for the vehicles in the lobby and dynamically adapting the switching of the communication interfaces by repeating steps (iv) through (vi).

12. The system according to claim 1, wherein the process further comprises:

monitoring the data associated with the vehicles and/or the matchmaking of the vehicles, the monitoring including at least the geographical location and/or a geographical destination for each of the-vehicles, and dynamically adapting the grouping of vehicles in the lobby so that additional vehicles are added to the lobby and/or vehicles in the lobby are removed.

13. The system according to claim 1, wherein the process further comprises:

using the switched to communication interface(s) of the one or more vehicles affected by the switching to provide communication between the vehicles in the lobby.

14. The system according to claim 1, wherein the process further comprises one or more of:

sharing route data related to the geographical location of the vehicles in the lobby and/or related to the geographical destination of the vehicles in the lobby;

defining different routes based on routes of vehicles in the lobby;

alerting vehicles in the lobby of obstacles, incidents or hazards based on routes of vehicles in the lobby.

15. The system according to claim 1, wherein:

the one or more servers contain a plurality of lobbies and one or more of the vehicles in one of plurality of lobbies can communicate with one or more of the vehicles in another of the plurality of lobbies.

16. The system according to claim 1, wherein:

the lobby stores route data on the one or more servers which is accessible by the vehicles to define a different route; and/or the lobby stores rating data related to previous vehicles in the lobby and/or stores routes of previous vehicles in the lobby that is/are accessible by the vehicles to define a different route; and/or the route data previously stored or rated is accessible by vehicles in the same lobby or can be accessed by vehicles in other lobbies.

17. A method controlled by one or more processors for optimizing quality of service (QOS) of vehicle communications, the method comprising:

(i) collecting data associated with vehicles;

(ii) matching the vehicles based upon commonality of at least some of the collected data being within one or more defined matching thresholds;

(iii) grouping the matched vehicles into a virtual lobby stored on the one or more servers;

(iv) analyzing quality of service (QOS) data associated with the communication interface for each vehicle in the lobby;

(v) based at least upon the analyzed QoS data, identifying one or more of the vehicles in the lobby having QoS that is below a defined QoS threshold and/or identifying one or more of the vehicles in the lobby having optimal QoS; and (vi) (a) switching the communication interface of any vehicle in the lobby having QoS below the defined QoS threshold to the communication interface used by another vehicle in the lobby having QoS at or above the defined QoS threshold; or (b) switching the communication interface of any vehicle in the lobby having QoS below the defined QoS threshold to the communication interface used by the one or more vehicles in the lobby having the optimal QoS; or (c) switching the communication interface of any vehicle in the lobby having QoS below the optimal QoS to the communication interface used by the one or more vehicles in the lobby having the optimal QoS.

18. A non-transitory computer readable medium storing program code which when executed by one or more processors performs at least the steps:

(i) collecting data associated with vehicles;

(ii) matching the vehicles based upon commonality of at least some of the collected data being within one or more defined matching thresholds;

(iii) grouping the matched vehicles into a virtual lobby stored on the one or more servers;

(iv) analyzing quality of service (QOS) data associated with the communication interface for each vehicle in the lobby;

(v) based at least upon the analyzed QoS data, identifying one or more of the vehicles in the lobby having QoS that is below a defined QoS threshold and/or identifying one or more of the vehicles in the lobby having optimal QoS; and (vi) (a) switching the communication interface of any vehicle in the lobby having QoS below the defined QoS threshold to the communication interface used by another vehicle in the lobby having QoS at or above the defined QoS threshold; or (b) switching the communication interface of any vehicle in the lobby having QoS below the defined QoS threshold to the communication interface used by the one or more vehicles in the lobby having the optimal QoS; or (c) switching the communication interface of any vehicle in the lobby having QoS below the optimal QoS to the communication interface used by the one or more vehicles in the lobby having the optimal QoS.

* * * * *